United States Patent
Hwang et al.

(10) Patent No.: US 9,845,114 B2
(45) Date of Patent: Dec. 19, 2017

(54) COWL STRUCTURE OF VEHICLE

(71) Applicant: Hyundai Motor Company, Seoul (KR)

(72) Inventors: Changsup Hwang, Gyeonggi-do (KR); Tae Jun Eom, Gyeonggi-do (KR); Heedae Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/206,509

(22) Filed: Jul. 11, 2016

(65) Prior Publication Data

US 2017/0158247 A1 Jun. 8, 2017

(30) Foreign Application Priority Data

Dec. 2, 2015 (KR) .................. 10-2015-0170980

(51) Int. Cl.
*B62D 25/08* (2006.01)
*B62D 25/14* (2006.01)
*B62D 27/02* (2006.01)

(52) U.S. Cl.
CPC ........... *B62D 25/081* (2013.01); *B62D 25/14* (2013.01); *B62D 27/023* (2013.01)

(58) Field of Classification Search
CPC ..... B62D 27/023; B62D 25/14; B62D 25/081
USPC ............................................ 296/192, 187.09
See application file for complete search history.

(56) References Cited

U.S. PATENT DOCUMENTS

| | | | | |
|---|---|---|---|---|
| 6,322,124 B1 * | 11/2001 | Kim | ..................... | B62D 25/081 296/187.09 |
| 7,540,557 B2 * | 6/2009 | Shimura | .............. | B62D 25/081 296/192 |
| 8,651,552 B2 * | 2/2014 | Shibutake | ............ | B62D 25/081 296/192 |
| 2015/0021953 A1 * | 1/2015 | Chung | ................... | B62D 25/04 296/187.09 |

FOREIGN PATENT DOCUMENTS

| | | |
|---|---|---|
| JP | 05-012335 U | 2/1993 |
| JP | 2012-051550 A | 3/2012 |
| KR | 10-1998-0055080 A | 9/1998 |
| KR | 10-0341222 B1 | 6/2002 |
| KR | 101462915 B1 * | 11/2014 ............. B62D 25/04 |

* cited by examiner

*Primary Examiner* — Pinel Romain
(74) *Attorney, Agent, or Firm* — Mintz Levin Cohn Ferris Glovsky and Popeo, P.C.; Peter F. Corless

(57) ABSTRACT

A cowl structure of the vehicle is provided. The cowl structure of the vehicle includes a cowl top panel that extends in a width direction of the vehicle and coupled to a dash panel that divides an engine and passenger compartment, and a cowl lower panel that extends in the width direction of the vehicle, is coupled to the dash panel to divide the engine and passenger compartment, and is disposed at a lower side than the cowl top panel in the vertical direction of the vehicle. Further, a cowl upper supporting member has an upper portion coupled to the cowl top panel and a coupling component of the cowl top panel and the dash panel and a lower portion coupled to the cowl lower panel. A cowl lower supporting member is coupled to the cowl lower panel and the dash panel.

10 Claims, 5 Drawing Sheets

COWL STRUCTURE OF VEHICLE

CROSS-REFERENCE TO RELATED APPLICATION

This application claims priority to and the benefit of Korean Patent Application No. 10-2015-0170980 filed in the Korean Intellectual Property Office on Dec. 2, 2015, the entire contents of which are incorporated herein by reference.

BACKGROUND (a) Field of the Invention

The present invention relates to a cowl structure of a vehicle, and more particularly, to a cowl structure of that vehicle to improves a pedestrian protection performance and a noise, vibration and harshness (NVH) performance.

(b) Description of the Related Art

Generally, a cowl structure coupled with a dash panel that separates an engine compartment and a passenger compartment includes a cowl top panel and a cowl lower panel. The cowl top panel and the cowl lower panel are formed to extend along a width direction of the vehicle. The cowl top panel is coupled to an upper portion of the dash panel and the cowl lower panel is coupled to a lower portion of the dash panel. The cowl structure requires reduction by absorbing an impact energy to protect pedestrians when the vehicle collides with the passenger. Further, the cowl structure provides support for a windshield of the vehicle and must minimize vibration that is transmitted along a vehicle body during acceleration of the vehicle.

In a conventional cowl structure, a cowl supporting member is disposed between the cowl top panel and the cowl lower panel. The cowl supporting member connects the cowl top panel and the cowl lower panel to each other, however an aperture or a notch must be processed for the passenger impact protection. However, the aperture or the notch is insufficient to simultaneously ensure the passenger impact protection performance and NVH performance.

The above information disclosed in this section is merely for enhancement of understanding of the background of the invention and therefore it may contain information that does not form the prior art that is already known in this country to a person of ordinary skill in the art.

SUMMARY

The present invention provides a cowl structure of the vehicle that absorbs the impact energy through a deformation during a vehicle collision to reduce a collision injury to the passenger and to increase the NVH performance of the vehicle, thereby improving marketability.

A vehicle of a cowl structure according to an exemplary embodiment of the present invention may include a cowl top panel that extends in a width direction of the vehicle and is coupled to a dash panel that divides an engine compartment and a passenger compartment, a cowl lower panel that extends in the width direction of the vehicle, is coupled to the dash panel that divides the engine compartment and the passenger compartment, and is disposed at a lower side than the cowl top panel in the height direction of the vehicle. The cowl structure may further include a cowl upper supporting member that has an upper portion coupled to the cowl top panel and a coupling component of the cowl top panel and the dash panel and a lower portion coupled to the cowl lower panel and a cowl lower supporting member coupled to the cowl lower panel and the dash panel.

The lower portion of the cowl upper supporting member may be in close contact with (e.g., abut) and coupled to an upper surface of the cowl lower panel in a vertical direction of the vehicle and the cowl lower supporting member may be in close contact with (e.g., abut) and coupled to a lower surface of the cowl lower panel along the vertical direction of the vehicle. The cowl upper supporting member may include two leg components separated in a front and rear direction of the vehicle, an upper body that connects the two leg components at an upper side and a lower body that connects lower portions of two leg components. The cowl upper supporting member may be formed of an approximate rectangular shape by two leg components, the upper body, and the lower body. The cowl lower supporting member may include a horizontal flange of a rectangular shape that extends in the front and rear direction and the width direction of the vehicle and a side flange curved in a lower side of the height direction of the vehicle from an edge of the horizontal flange.

The horizontal flange may be coupled to the upper surface of the cowl top panel in the vertical direction of the vehicle. The side flange may be coupled to the dash panel. The cowl upper supporting member may include two edges of a triangle shape toward an upper side of the vertical direction of the vehicle; and a first flange curved perpendicularly may be provided at the front edge disposed at the front side of the front and rear direction of the vehicle and coupled to the cowl top panel by a welding.

A second flange curved perpendicularly may be disposed at the upper portion of the rear leg component positioned at the rear side of the front and rear direction of the vehicle, may abut the cowl top panel, and may be coupled by welding. Two third flanges curved (e.g., disposed at a perpendicular position) may be disposed at the lower end of two leg parts and may be coupled to the upper surface of the cowl lower panel (e.g., via welding or the like). The lower portion of the cowl upper supporting member and the cowl lower supporting member may be disposed to overlap in the vertical direction of the vehicle.

According to the cowl structure of the vehicle according to an exemplary embodiment, the cowl top panel and the dash panel may be coupled with the upper portion of the cowl upper supporting member and the cowl lower panel may be coupled with the cowl upper supporting member and the cowl lower supporting member. Accordingly, the connection rigidity between the cowl top panel and the dash panel and the cowl lower panel may be increased, thereby improving the NVH performance of the vehicle.

Further, the cowl upper supporting member may be extended of the rectangular shape in the front and rear direction of the vehicle to minimize the passenger collision protection in the section that is not deformed, thereby effectively improving the passenger collide performance

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Hereinafter, an exemplary embodiment of the present invention will be described in detail with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
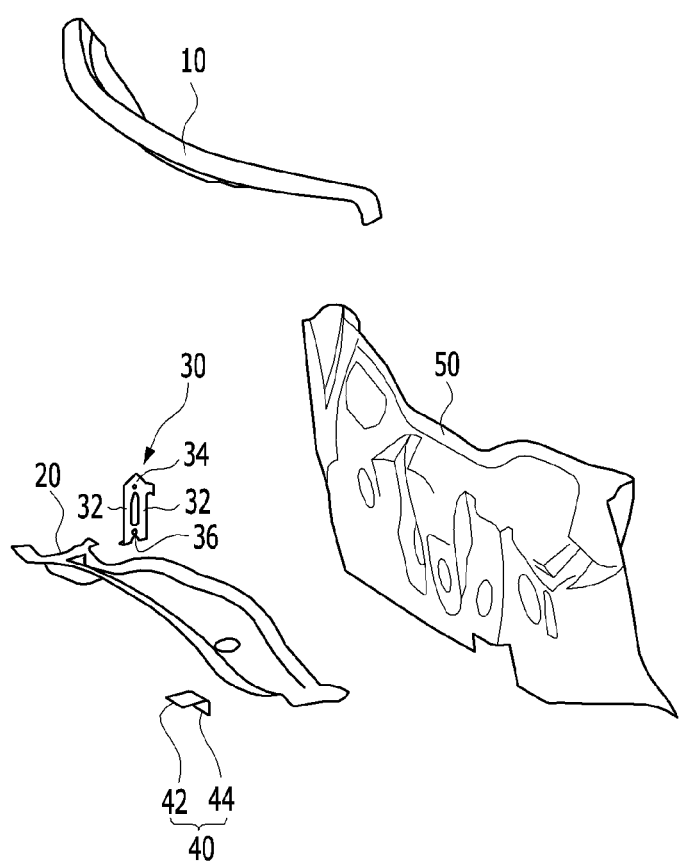
FIG. 1 is an exemplary exploded perspective view of a cowl structure of a vehicle according to an exemplary embodiment of the present invention.
Figure 2:
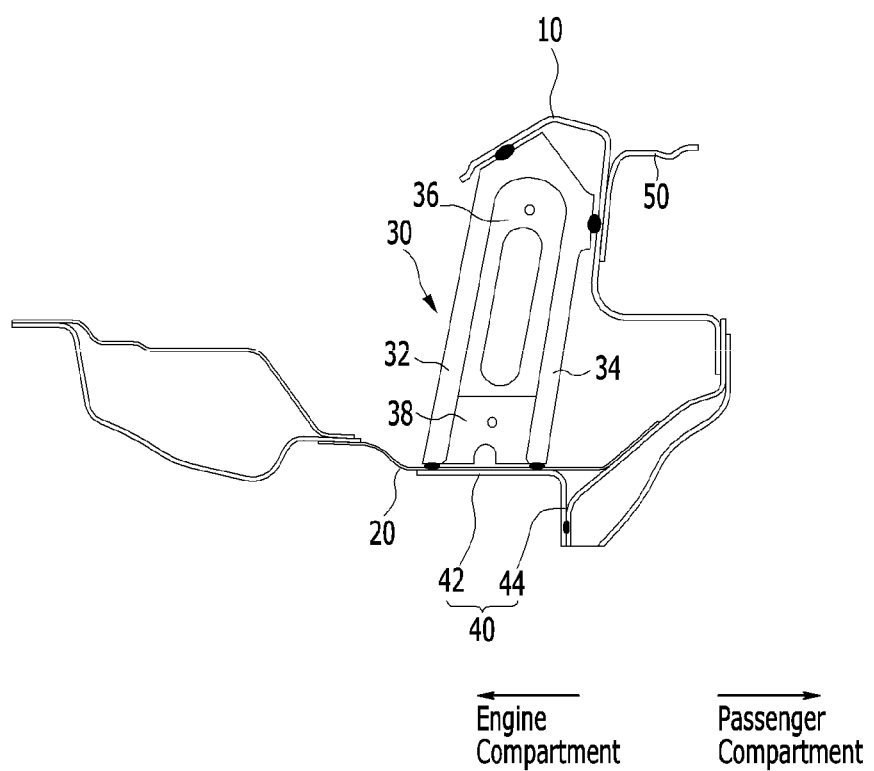
FIG. 2 is an exemplary cross-sectional view of a cowl structure of a vehicle according to an exemplary embodiment of the present invention.

Referring to FIG. 1 and FIG. 2, a cowl structure of the vehicle according to an exemplary embodiment of the present invention may include a cowl top panel 10 and a cowl lower panel 20 formed to extend along the width direction of the vehicle. Additionally, a cowl upper supporting member 30 and a cowl lower supporting member 40 may be interposed between the cowl top panel 10 and the cowl lower panel 20 and may integrally connect the cowl top panel 10 and the cowl lower panel 20. The cowl top panel 10 may be coupled to an upper portion of the vehicle in a vertical direction of the vehicle in a dash panel 50 that separates the engine compartment and the passenger compartment and the cowl lower panel 20 may be coupled to a lower portion of the vehicle in the vertical direction of the vehicle in the dash panel 50.

Further, in the cowl upper supporting member 30 the upper portion of the vehicle in the vertical direction of the vehicle may be coupled to the cowl top panel 10 and integrally combined with the coupling component of the cowl top panel 10 and the dash panel 50. The lower portion of the cowl upper supporting member 30 in the vertical direction of the vehicle may be coupled to the cowl lower panel 20 to abut the upper surface of the cowl lower panel 20 in the vertical direction of the vehicle. The cowl lower supporting member 40 may be coupled to the lower surface of the cowl lower panel 20 in the vertical direction of the vehicle.

The cowl upper supporting member 30 may include two leg parts 32 disposed to be separated in a front and rear direction of the vehicle, an upper body 34 may connect the two leg components 32 at the upper portion, and a lower body 36 may connect the lower portions of the two leg components 32. The cowl upper supporting member 30 may form an approximate rectangular shape by two leg components 32, the upper body 34, and the lower body 36. The cowl lower supporting member 40 may be formed of a plane shape curved in an approximately "¬" shape (e.g., a 90 degree right angle) toward the front of the vehicle. In other words, the cowl lower supporting member 40 may include the horizontal flange 42 with the approximate rectangular shape that extends in the front and rear direction and the width direction of the vehicle and the side flange 44 may be curved in the lower side of the height direction of the vehicle from an edge of the horizontal flange 42.

Figure 3:
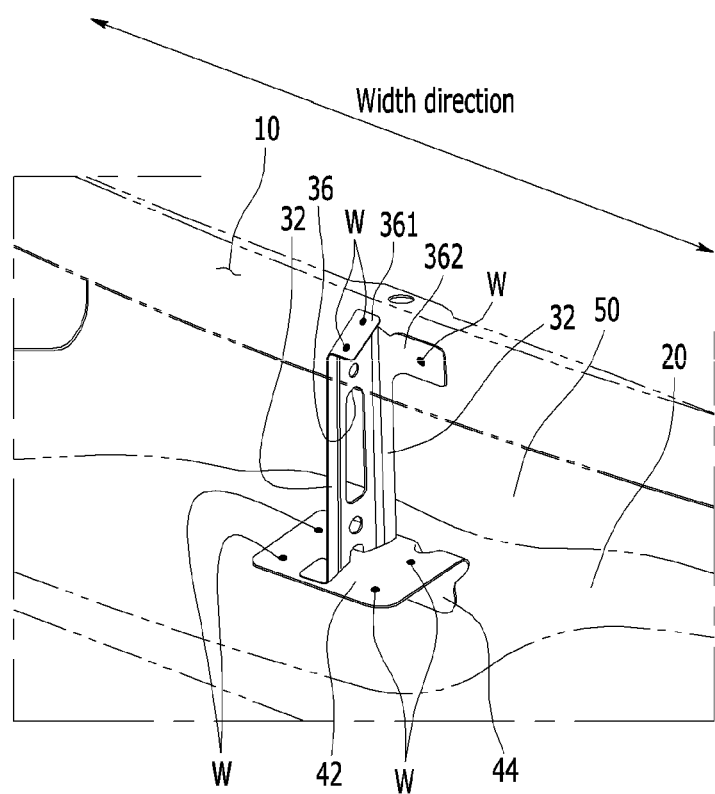
FIG. 3 is an exemplary mounted perspective view of a cowl structure of a vehicle according to an exemplary embodiment of the present invention.
Figure 4:
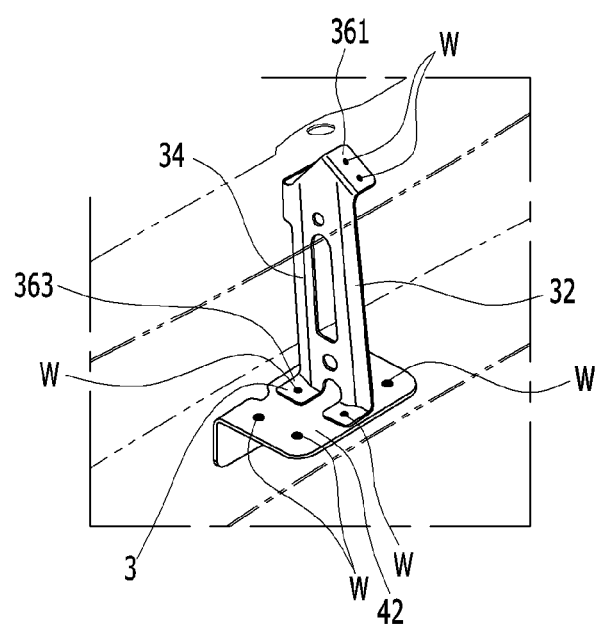
FIG. 4 is an exemplary mounted perspective view of a cowl structure of a vehicle according to an exemplary embodiment of the present invention.
Figure 5:
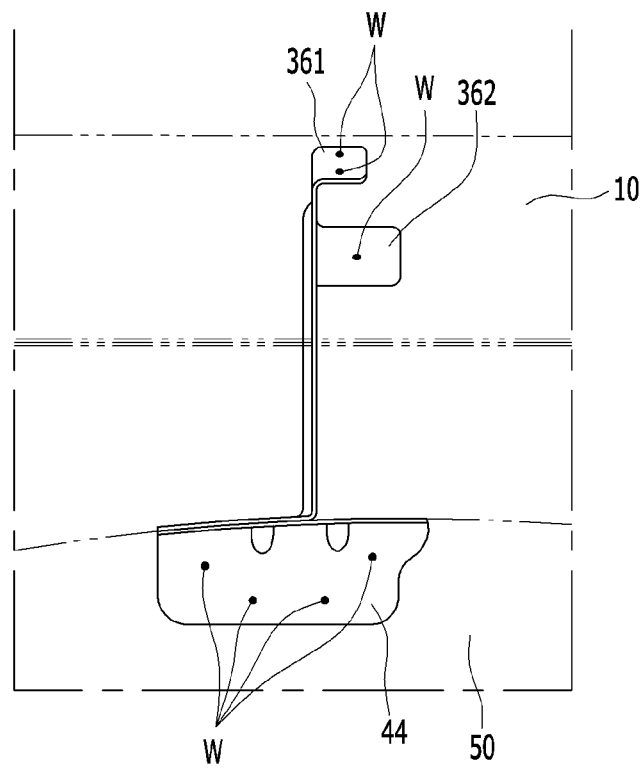
FIG. 5 is an exemplary front view of a cowl structure of a vehicle according to an exemplary embodiment of the present invention.

Referring to FIG. 3 to FIG. 5, the cowl upper supporting member 30 may include two edges of a triangle shape toward the upper side of the vertical direction of the vehicle, a first flange 361 curved approximately perpendicularly may be disposed in the front edge positioned at the front side of the front and rear direction of the vehicle, and the first flange 361 may be coupled to the cowl top panel 10 and may be coupled by welding W.

A second flange 362 curved approximately perpendicularly may be disposed at the upper portion of the rear leg part 32 positioned at the rear side of the front and rear direction of the vehicle, and the second flange 362 may be coupled to the cowl top panel 10 and may be coupled by the welding W. The horizontal flange 42 of the cowl lower supporting member 40 may be coupled to a bottom surface of the cowl lower panel 20 by the welding W.

Two third flanges 363 curved approximately perpendicularly may be disposed at the lower end of two leg components 32, and the third flange 363 may be coupled to the upper surface of the cowl lower panel 20 and coupled by the welding W. The third flange 363 and the side flange 44 of the cowl lower supporting member 40 may be overlapped in the vertical direction of the vehicle. The side flange 44 of the cowl lower supporting member 40 may abut the dash panel 50 and may be coupled by the welding W.

The cowl top panel 10 and the dash panel 50 may be coupled with the upper portion of the cowl upper supporting member 30. Further, the cowl lower panel 20 and the dash panel 50 may be coupled with the cowl upper supporting member 30 and the cowl lower supporting member 40. Accordingly, the connection rigidity of the cowl top panel 10 and the dash panel 50, and the cowl lower panel 20 may be increased and to improve the NVH performance of the vehicle. Additionally, the cowl upper supporting member 30 may be formed to extend in the rectangular shape in the front and rear direction of the vehicle to minimize the section that the deformation is not generated in the passenger collision protection, thereby effectively improving the passenger collide protection performance.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: cowl upper supporting member
20: cowl lower supporting member
30: cowl top panel
32: leg component
34: upper body
36: lower body
40: cowl lower panel
42: horizontal flange
44: side flange
50: dash panel

What is claimed is:

1. A cowl structure of a vehicle, comprising:
   a cowl top panel that extends in a width direction of the vehicle and is coupled to a dash panel to separate an engine compartment and a passenger compartment;
   a cowl lower panel that extends in the width direction of the vehicle, is coupled to the dash panel to separate the engine compartment and the passenger compartment, and is disposed at a lower side than the cowl top panel in a vertical direction of the vehicle;
   a cowl upper supporting member having an upper portion coupled to the cowl top panel and a coupling component of the cowl top panel and the dash panel and a lower portion coupled to the cowl lower panel; and
   a cowl lower supporting member coupled to the cowl lower panel and the dash panel, wherein the cowl lower supporting member includes:
   a horizontal flange of a rectangular shape that extends in the width direction of the vehicle; and
   a side flange curved in a lower side of the vertical direction of the vehicle from an edge of the horizontal flange.

2. The cowl structure of claim 1, wherein:
   the lower portion of the cowl upper supporting member abuts and is coupled to an upper surface of the cowl lower panel in the vertical direction of the vehicle, and
   the cowl lower supporting member abuts and is coupled to a lower surface of the cowl lower panel in the vertical direction of the vehicle.

3. The cowl structure of claim 1, wherein the cowl upper supporting member includes:
   two leg components disposed to be separated from each other;
   an upper body having the two leg components coupled to an upper side; and
   a lower body coupled to lower portions of the two leg components.

4. The cowl structure of claim 3, wherein the cowl upper supporting member has a rectangular shape formed by the two leg components, the upper body, and the lower body.

5. The cowl structure of claim 3, wherein:
   the cowl upper supporting member includes two edges of a triangle shape toward an upper side of the vertical direction of the vehicle, and
   a first flange perpendicularly disposed with respect to the cowl upper supporting member and is coupled to the cowl top panel by a welding.

6. The cowl structure of claim 5, wherein a second flange perpendicularly disposed with respect to one of the two leg components, abuts the cowl top panel, and is coupled by a welding.

7. The cowl structure of claim 6, wherein two third flanges are perpendicularly disposed at lower ends of the two leg components, respectively, and are coupled to an upper surface of the cowl lower panel by the welding.

8. The cowl structure of claim 1, wherein the horizontal flange is coupled to an upper surface of the cowl top panel in the vertical direction of the vehicle.

9. The cowl structure of claim 1, wherein the side flange is coupled to the dash panel.

10. The cowl structure of claim 1, wherein the lower portion of the cowl upper supporting member and the cowl lower supporting member are disposed to overlap in the vertical direction of the vehicle.

* * * * *